United States Patent [19]

Sudduth

[11] 3,778,969

[45] Dec. 18, 1973

[54] EJECTOR VAPOR RECOVERY SYSTEM FOR STORED VOLATILE LIQUIDS

[75] Inventor: Jackie Wayne Sudduth, Brookfield, Ill.

[73] Assignee: Chicago Bridge & Iron Company, Oak Brook, Ill.

[22] Filed: Apr. 12, 1972

[21] Appl. No.: 243,187

[52] U.S. Cl. .......................................... 55/55, 55/84
[51] Int. Cl. ............................................. B01d 19/00
[58] Field of Search ..................... 55/52, 55, 88, 89; 62/54

[56] References Cited
UNITED STATES PATENTS

| | | | |
|---|---|---|---|
| 2,947,379 | 8/1960 | Aubrey | 55/88 |
| 3,613,333 | 10/1971 | Gandenier | 55/89 |
| 3,284,992 | 11/1966 | Wickman | 55/71 |

*Primary Examiner*—Charles N. Hart
*Attorney*—Charles J. Merriam et al.

[57] ABSTRACT

A process of separating a volatile liquid vapor from admixture with air by pressurizing a liquid stream which is at a temperature below its boiling point, feeding the pressurized liquid stream through an ejector to a lower pressure, conducting a stream of air and vapors of the liquid to the suction side of the ejector to form an admixture of liquid, liquid vapor and air, at a pressure intermediate the pressure of the streams fed to the ejector but adequate to condense the volatile liquid vapors to liquid, and gravity separating the volatile liquid, including condensed vapor, from the air.

8 Claims, 1 Drawing Figure

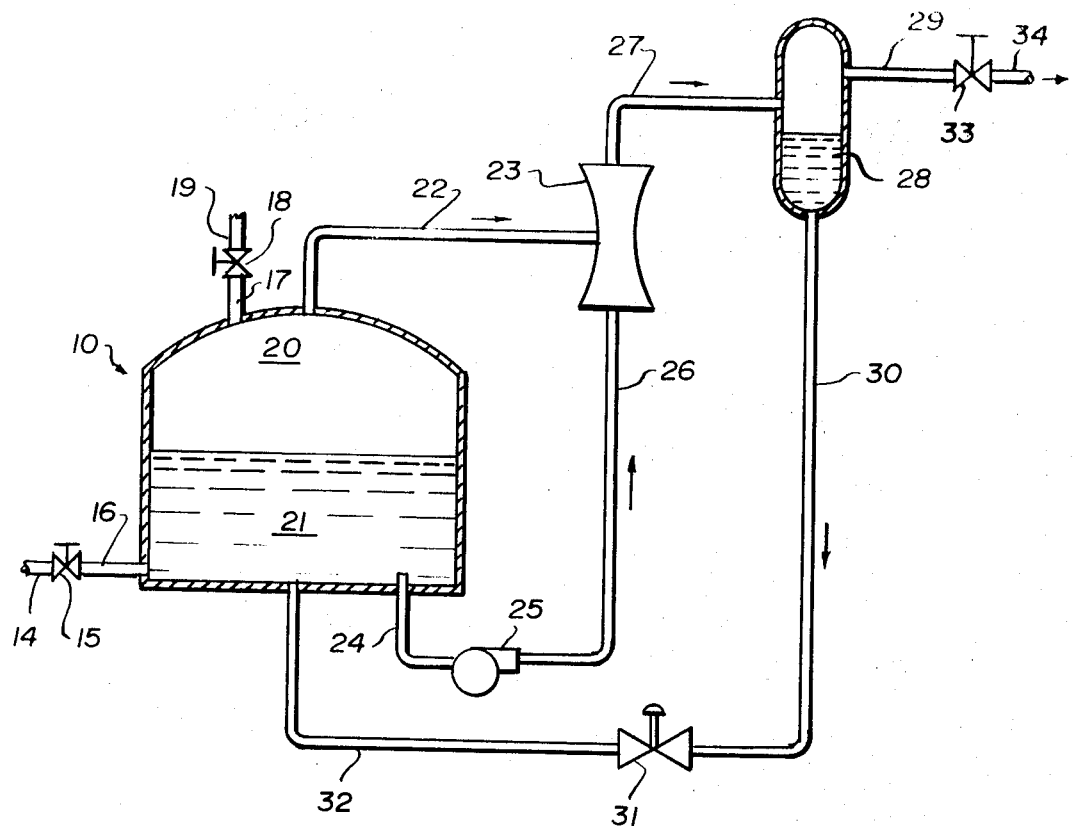

EJECTOR VAPOR RECOVERY SYSTEM FOR STORED VOLATILE LIQUIDS

This invention relates to apparatus and processes for storing volatile liquids. More particularly, this invention is concerned with methods and apparatus for recovering vapors of volatile liquids from mixtures with air.

Many volatile liquids, including gasoline, kerosene, fuel oil, crude oil and benzene, are widely used industrially and commercially. These and other volatile liquids are routinely transported various distances by pipeline, railroad tank car, tank truck, ship or barge. Upon arrival at a destination, the volatile liquid is normally stored in a storage tank pending use or further distribution.

Because the boiling point of many of the liquids is generally quite high, such as 150° F or higher, the liquid can be readily stored at about atmospheric pressure or slightly above and the use of tanks designed to withstand greater pressures avoided. The tanks used are generally thin metal shells capable of withstanding the hydrostatic load and only a relatively small variation, internally and externally, from atmospheric pressure. Therefore, it is conventional when a product is removed from such a tank to permit air to flow in to equalize internal and external pressures. Similarly, when a tank is being filled with liquid, means are provided to vent or remove vapor and air so the internal pressure does not exceed safe pressure levels.

Venting the mixture of vapor and air to the atmosphere is undesirable because of the resulting air pollution and loss of valuable vapors. Although vapors can be condensed from the mixture by refrigeration and the air, virtually free of vapors, then vented to the atmosphere, the capital investment in a refrigeration system, and necessary start up time, deters this approach. There is accordingly a need for an alternative process and apparatus which can be used to separate or recover vapor from admixture with air.

According to the present invention, there is provided, the process of separating a volatile liquid vapor from admixture with air which comprises pressurizing a volatile liquid stream which is at a temperature below its boiling point, feeding the pressurized volatile liquid stream to the inlet side of an ejector and through an ejector outlet to a lower pressure thereby creating a suction side in the ejector, conducting a stream of air and vapors of the volatile liquid to the suction side of the ejector to form an admixture of volatile liquid, volatile liquid vapor and air, at a pressure intermediate the pressure of the streams fed to the ejector but adequate to condense the vapors to liquid, and gravity separating the volatile liquid, including condensed vapor, from the air. The liquid leaves the ejector at a lower pressure than at which it was fed to it but, since the temperature of the liquid is comparatively the same or little different, the pressure is adequate to keep it liquid. The process is particularly useful when the streams are at about ambient temperature and/or when the mixture of vapors and air is at about atmospheric pressure or slightly thereabove.

Separation of the volatile liquid, including the condensed vapor, from the air can be readily achieved in any suitable way. In one method the mixture which leaves the ejector can be conducted to a separator vessel. The liquid can be separated in the vessel, such as by gravity, and thereafter the liquid can be removed and returned to a storage tank while the air, low in vapor, can be vented to the atmosphere.

An advantage of the process is that a liquid pump can be used to pressurize the volatile liquid fed to the ejector. Use of a more expensive vapor compressor is thereby avoided. In addition, since the vapor-air mixture can be explosive the high spark risk associated with use of a compressor, if permitted at all, to pressurize the mixture is avoided. Furthermore, more of the conduits can be liquid pipes, which are less expensive and smaller, rather than vapor pipes.

Also provided by the invention is a novel combination of apparatus for recovering the vapor of a volatile liquid from admixture with air. The apparatus comprises a storage tank, a liquid conduit from the storage tank to a liquid pump, a liquid conduit from the liquid pump to the inlet side of an ejector, a vapor conduit from the vapor space of the storage tank to the suction side of the ejector, a conduit from the outlet side of the ejector to a gravity separator vessel, a conduit from the separator vessel to a disposal means for venting air from the separator vessel, and a liquid conduit from the separator vessel to the storage tank for returning volatile liquid. Also included is such ancillary apparatus as would normally be included in a storage system for a volatile liquid.

The invention will be described further in conjunction with the attached drawing which shows schematically a novel combination of apparatus useful in practicing the process of this invention.

Storage tank 10, as shown in the drawing, is a conventional storage tank. Conduit 14 feeds a volatile liquid through valve 15 and conduit 16 to fill the tank. Valve 15 is closed when filling stops. When liquid is to be removed from tank 10 for distribution or shipment it is removed through conduits 16 and 14 with valve 15 open.

In order to maintain a suitable pressure inside of tank 10 during emptying operations, conduit 17 is provided at the top of the tank in communication with vapor space 20. Conduit 17 is connected to valve 18 which is connected in turn to conduit 19. Valve 18 is opened to permit air to flow through conduits 19 and 17 into the tank during removal of volatile liquid from the tank.

During filling of tank 10 with a volatile liquid, the vapor space is reduced and vapor must be removed to prevent over pressurizing the tank. The vapor is removed from the tank by vapor conduit 22 which communicates with the tank vapor space and the suction side of ejector 23.

A stream of volatile liquid 21 is removed from tank 10 by liquid conduit 24 which communicates with the lower part of the tank and liquid pump 25. The pressure of the volatile liquid is increased by pump 25 to a pressure substantially higher than in tank 10, and advisably to a pressure of about 400 to 550 psia. The pressurized volatile liquid stream is fed by conduit 26 from pump 25 to the inlet side of ejector 23. The pressurized volatile liquid flows through the ejector and thereby produces suction or a reduced pressure in communication with vapor conduit 22 thereby causing a stream of vapor to be pushed into the suction side of the ejector.

The stream from the outlet of ejector 23 is fed by conduit 27 to separator vessel 28. The stream constitutes an admixture of volatile liquid, volatile liquid vapor and air. The admixture is at a pressure between the pressure in vapor space 20 and the pressure of the volatile liquid stream fed by conduit 26 to the ejector. It is essential in any event that the pressure of the admixture be sufficiently high to cause condensation of the volatile liquid vapor at the temperature of the stream.

When the admixture stream reached separator vessel 28 by conduit 27, the volatile liquid, including condensed volatile liquid vapor, separates from the air by gravity. Air, including some uncondensed vapor, is fed from vessel 28 by conduit 29 through valve 33 and conduit 34 for disposal in a suitable manner. Because the amount of vapor in the air is small, it can be vented to the atmosphere or flared.

Volatile liquid is removed from vessel 28 by conduit 30 which feeds it through valve 31 to conduit 32 which conveys the liquid back to tank 10.

In operating the process and apparatus of the invention, the pressure of the mixture in conduit 27 is below the pressure in conduit 26 and substantially above the air-vapor mixture pressure in conduit 22. It is advisable to create a pressure in conduit 27 as high as reasonably practical so that the amount of vapor condensed and removed leaves the air very low in vapor and desirably containing not more than 10 volume percent vapor. Since the volume percent of vapor in the gaseous mixture in vessel 28 is determined by the formula:

Vol. percent = 100 × vapor pressure of volatile liquid/total pressure it can be readily seen that the vapor remaining in the air is reduced with increase in total pressure. The energy from the pump eventually ends up as heat in the contents of the tank but it is dissipated by heat transfer through the uninsulated tank to the ambient air.

The invention is considered particularly useful in recovering vapors of stored organic liquid materials which have a boiling point of about 150° to 350° F.

The following example is presented to further illustrate the invention.

Example

Crude oil having a vapor pressure of 8 psia at 80° F is filled into tank 10 of the drawing. The vapor space 20 has a pressure of 15 psia and is at 80° F.

Crude oil at 80° F is removed from tank 10 by conduit 24, pressurized by pump 25 and sent at 500 psia at a flow rate of 212,000 lbs/hr to ejector 23. Vapor and air are removed at 80° F from tank 10 by conduit 22 and fed at 15 psia and a flow rate of 4,020 lbs/hr to the suction side of ejector 23.

The admixture at 80° F and 115 psia flows from the outlet of ejector 23 at a rate of 216,020 lbs/hr to vessel 28 where the liquid separates by gravity from the air. The air, containing less than 7 volume percent crude oil vapor, at 80° F and 115 psia is vented by conduit 29 to the atmosphere at a rate of 3,740 lbs/hr. Liquid crude oil at 80° F and 115 psia is fed from vessel 28 at a rate of 213,861 lbs/hr to conduit 30 which conveys it through open valve 31 to conduit 32 and then to tank 10.

The foregoing detailed description has been given for clearness of understanding only, and no unecessary limitations should be understood therefrom, as modifications will be obvious to those skilled in the art.

What is claimed is:

1. The process of separating a volatile liquid vapor from admixture with air which comprises:
    pressurizing a volatile liquid stream which is at a temperature below its boiling point,
    feeding the pressurized volatile liquid stream to the inlet side of an ejector and through an ejector outlet to a lower pressure thereby creating a suction side in the ejector,
    conducting a stream of air and vapors of the volatile liquid to the suction side of the ejector to form an admixture of volatile liquid, volatile liquid vapor and air, at a pressure intermediate the pressure of the streams fed to the ejector but adequate to condense the vapor to liquid, and
    separating the volatile liquid, including condensed vapor, from the air.

2. The process of claim 1 in which the streams are at about ambient temperature.

3. The process of claim 1 in which the mixture of vapors and air is at about atmospheric pressure or slightly thereabove.

4. The process of claim 1 in which pressurizing of the volatile liquid stream is effected by a liquid pump.

5. The process of claim 1 in which the admixture is conveyed from the ejector to a separator vessel and the liquid separated from air therein.

6. The process of claim 1 in which the liquid is an organic liquid material having a boiling point of about 150° to 350° F.

7. The process of separating a volatile liquid vapor from admixture with air which comprises:
    removing a volatile liquid stream at a temperature below its boiling point from a storage tank containing such liquid and a mixture of air and vapor from the liquid,
    pressurizing the volatile liquid stream,
    feeding the pressurized volatile liquid stream to the inlet side of an ejector and through an ejector outlet to a lower pressure thereby creating a suction side in the ejector,
    conducting a stream of air and vapors of the volatile liquid from the tank to the suction side of the ejector to form an admixture of volatile liquid, volatile liquid vapor and air, at a pressure intermediate the pressure of the streams fed to the ejector but adequate to condense the vapors to liquid, and
    separating the volatile liquid, including condensed vapor, from the air.

8. Apparatus comprising:
    a storage tank for a volatile liquid,
    a liquid conduit from the storage tank to a liquid pump,
    a liquid conduit from the liquid pump to the inlet side of an ejector,
    a vapor conduit from the vapor space of the storage tank to the suction side of the ejector,
    a conduit from the outlet side of the ejector to a gravity separator vessel,
    a conduit from the separator vessel to a disposal means for venting air from the separator vessel, and
    a liquid conduit from the separator vessel to the storage tank for returning liquid thereto.

* * * * *